No. 832,645. PATENTED OCT. 9, 1906.
P. P. WELTY.
BRICK MOLDING APPARATUS.
APPLICATION FILED FEB. 14, 1906.

5 SHEETS—SHEET 1.

No. 832,645. PATENTED OCT. 9, 1906.
P. P. WELTY.
BRICK MOLDING APPARATUS.
APPLICATION FILED FEB. 14, 1906.

6 SHEETS—SHEET 2.

Witnesses
F. L. Orwand
L. E. Barkley

Inventor
Peter P. Welty
By Frank S. Ahrman
Attorney

No. 832,645. PATENTED OCT. 9, 1906.
P. P. WELTY.
BRICK MOLDING APPARATUS.
APPLICATION FILED FEB. 14, 1906.

5 SHEETS—SHEET 3.

Witnesses
F. L. Orrand
L. E. Barkley

Inventor
Peter P. Welty
Frank A. Appleman
By
Attorney

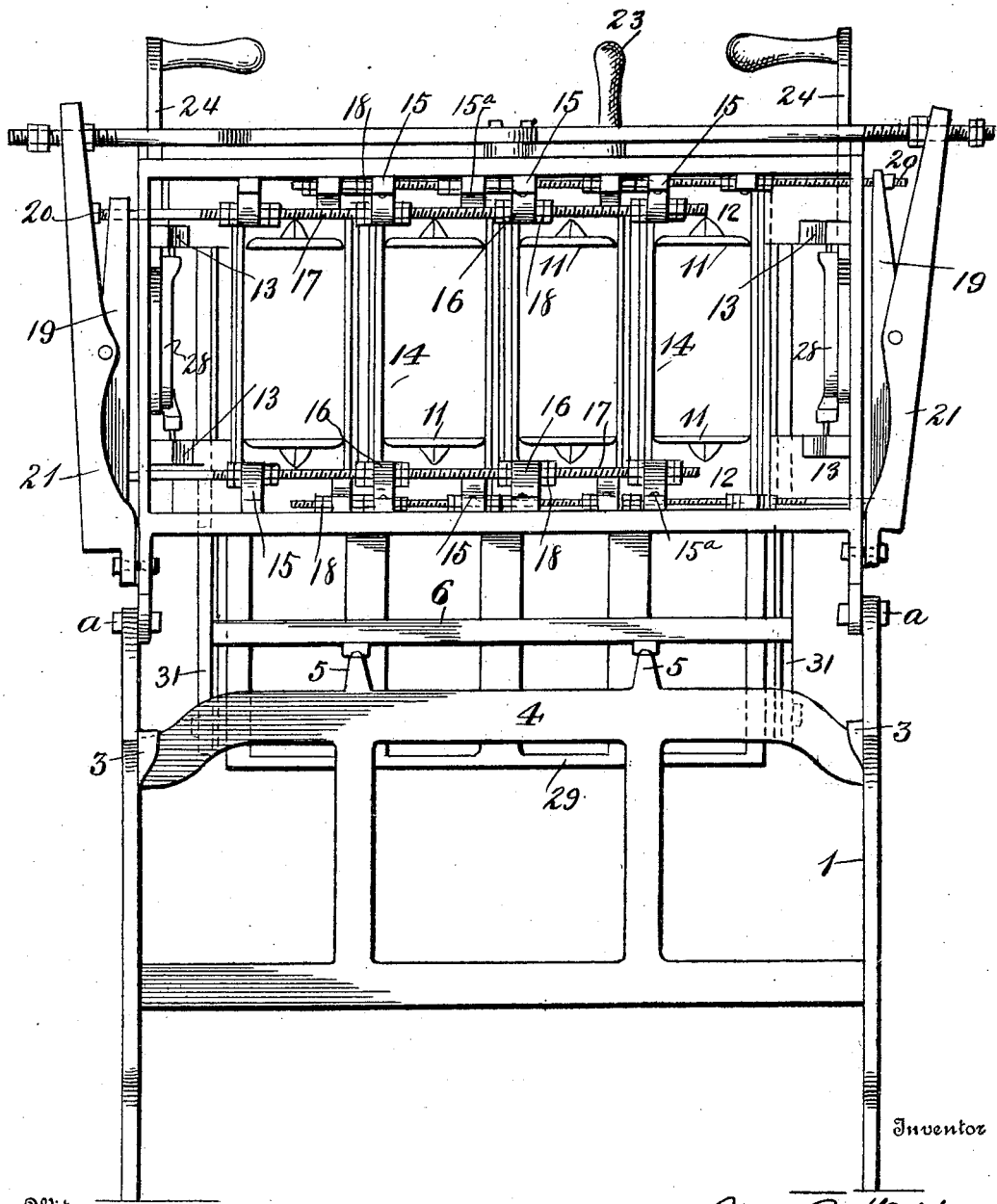

No. 832,645. PATENTED OCT. 9, 1906.
P. P. WELTY.
BRICK MOLDING APPARATUS.
APPLICATION FILED FEB. 14, 1906.
5 SHEETS—SHEET 5.
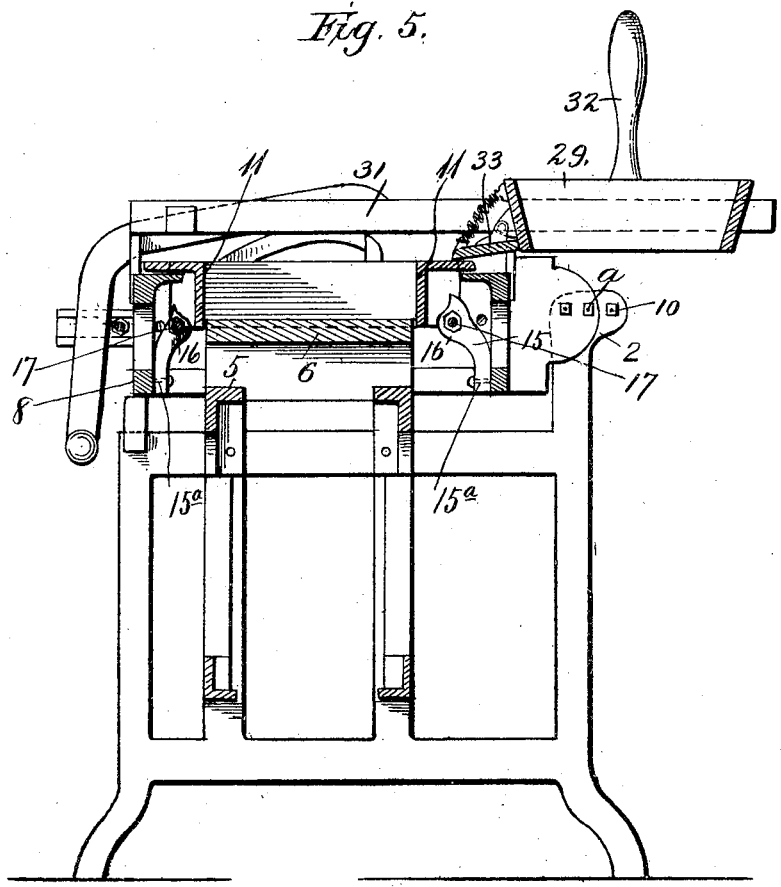
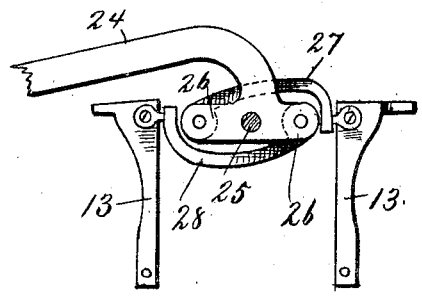
Witnesses
F. L. Orrand
L. E. Barkley
Inventor
Peter P. Welty
By Frances Akkerman
Attorney

UNITED STATES PATENT OFFICE.

PETER P. WELTY, OF COLUMBUS GROVE, OHIO.

BRICK-MOLDING APPARATUS.

No. 832,645.   Specification of Letters Patent.   Patented Oct. 9, 1906.

Application filed February 14, 1906. Serial No. 301,095.

*To all whom it may concern:*

Be it known that I, PETER P. WELTY, a citizen of the United States of America, residing at Columbus Grove, in the county of Putnam and State of Ohio, have invented certain new and useful Improvements in Brick-Molding Apparatus, of which the following is a specification.

This invention relates to devices for molding plastic compounds, and has reference particularly to a brick-molding machine in which the molds are expansible.

An object of this invention is to provide novel means for moving the sides and ends of the molds for the purpose of freeing the sections of the mold after the block or brick is formed in the usual manner, means being also provided for returning the mold-sections to their proper operative positions.

A further object of this invention is to provide a suitable hopper having a compartment registering with each mold and means for permitting the movement of the hopper with relation to the molds.

Furthermore, the invention consists in the novel troweling device carried by the hopper, whereby the contents of the molds have their upper surfaces smoothed as the hopper is moved from over the said molds.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1:
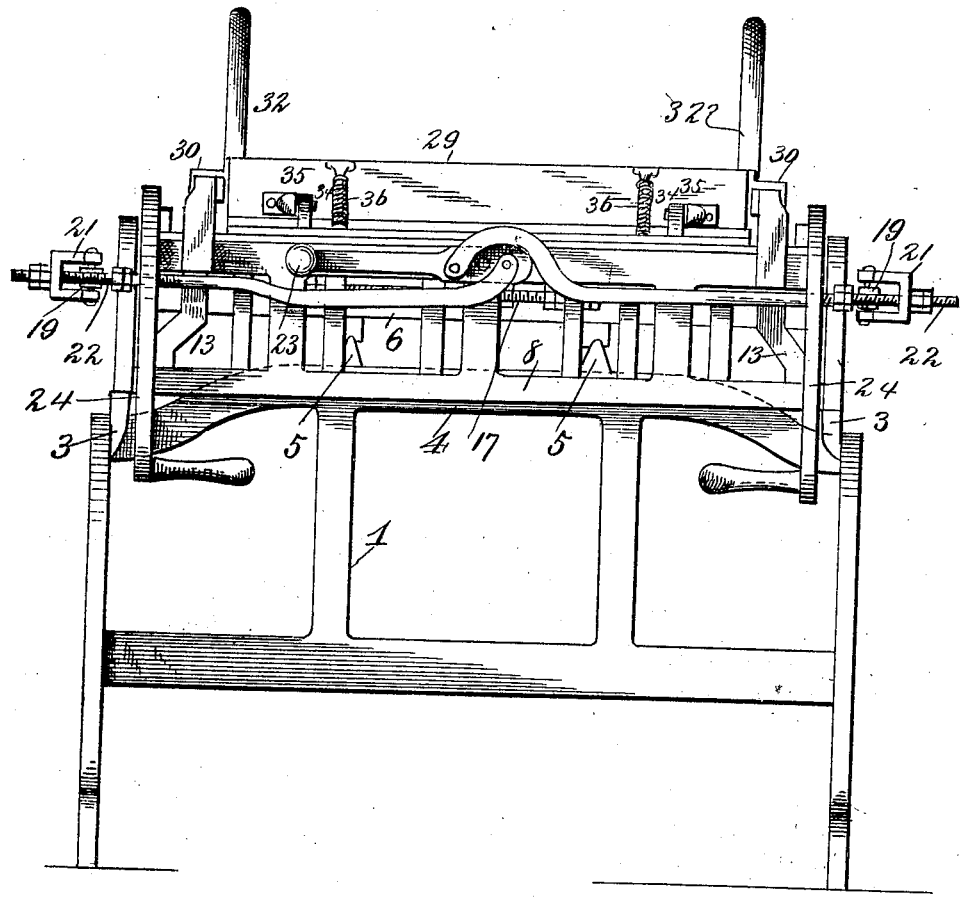
Figure 2:
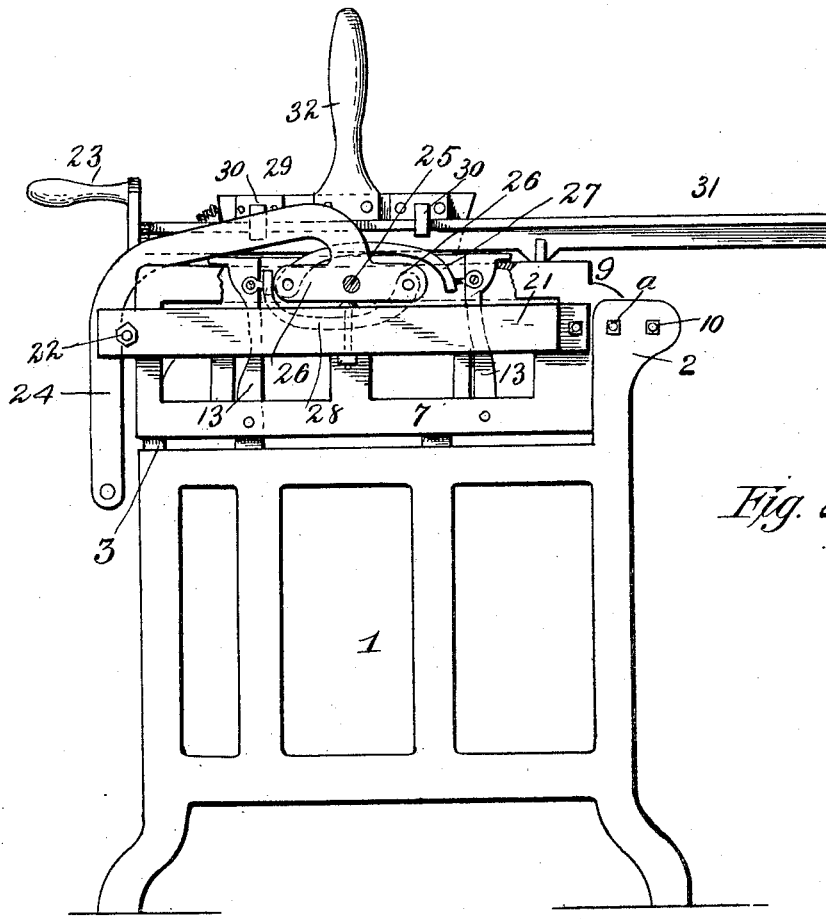
Figure 8:
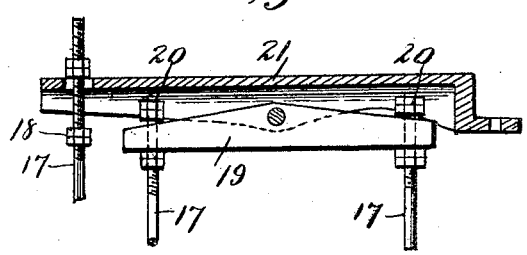
Figure 3:
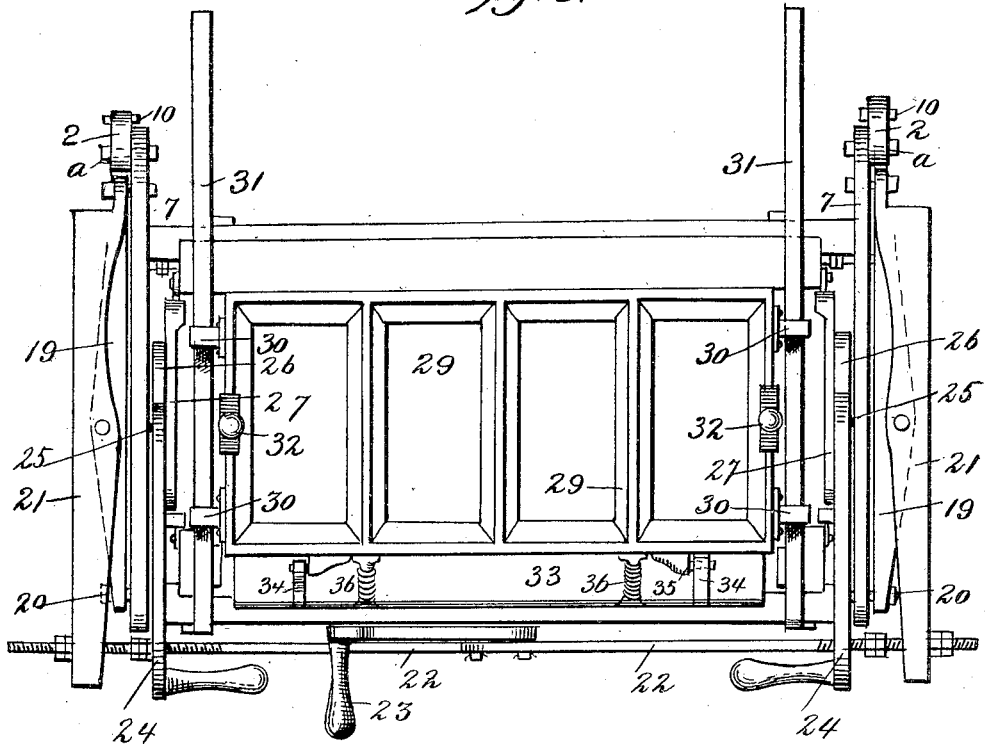
Figure 6:
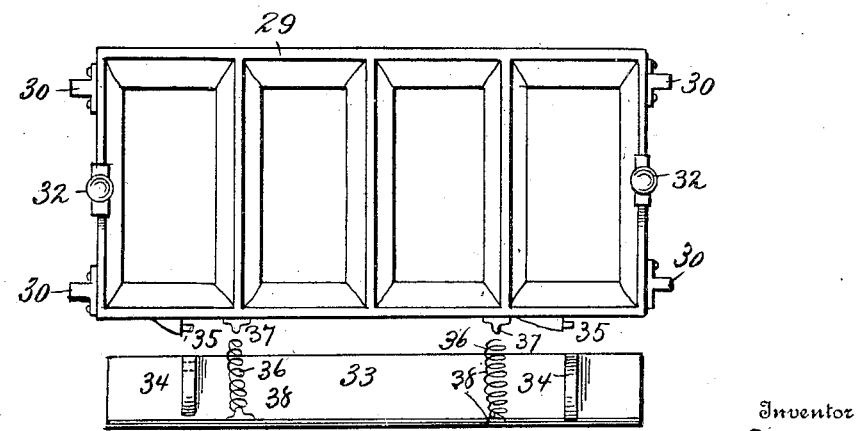

Figure 1 illustrates in elevation the front of a brick-molding machine embodying the invention. Fig. 2 is an end view thereof. Fig. 3 is a top plan view thereof. Fig. 4 is a front view with the molds elevated which is the position they assume after the molding operation. Fig. 5 is a transverse sectional view. Fig. 6 is a plan view of the hopper with the troweling mechanism detached. Fig. 7 is a detail view, partly in section, showing the ends of the mold and the support therefor. Fig. 8 is a view in detail of a portion of the mechanism for moving the sides of the molds. Fig. 9 is a view in elevation showing a portion of the mechanism for moving the ends of the molds. Fig. 10 is a view in elevation of a side of a mold.

In the drawings, 1 indicates a suitable stand with extensions 2, to which the mold and hopper carriage is hinged through the medium of the pivots $a$, the said carriage having its front portion supported by the posts 3, secured to or formed with the stand 1. The stand is further provided with braces 4, connected by ribs 5, which are designed to support the pallets 6.

The carriage comprises a rectangular frame formed by the ends 7 and sides 8. The rear of the end sections have shoulders 9, which abut the studs or pins 10 on the extensions 2, whereby the rearward swing of the carriage is limited.

The molds are made up of sections movable with relation to each other, the ends 11 of the molds being formed with continuous bars 12, extending longitudinally of the carriage. The bars 12 are provided with the depending arms 13, which are pivotally secured to the ends 7 of the frame, as at $13^a$, more particularly shown in Fig. 7. By this arrangement the ends of the molds are permitted a certain oscillatory movement. The sides 14 of the mold have extensions forming arms 15, which are pivotally connected to the frame of the carriage at $15^a$ in order that the sides 14 of the mold may also have an oscillatory movement. Where the sides and arms merge, bosses 16 are formed provided with transverse apertures to receive the threaded rods 17. The threaded rods are arranged in pairs extending in opposite directions longitudinally of the carriage. Nuts 18 are threaded on the rods and engage the sides of the bosses, so that movement of the threaded rods communicates motion to the bosses and the sides of the mold. Owing to the fact that the rods 17 are threaded nearly their entire length, it follows that the sides of the mold may be adjusted through the medium of the nuts heretofore described.

The outer ends of the rods 17 extend through the apertures of yokes 19 and are adjustable lengthwise through the medium of the nuts 20. The yokes are pivoted approximately centrally to a lever 21 on each end of the carriage, and said levers are moved oppositely through a suitable mechanism, (to be hereinafter described,) which movement is communicated to the yokes, causing a reciprocation of the threaded rods. As the movement of the threaded rods is communicated to the sides of the molds, it follows that the said sides may be displaced from the block or brick molded to the extent of freeing the brick from the molds entirely in order that the said brick will not be disturbed when the carriage is swung to a vertical position, it being understood that the ends of the molds have also been moved through the mechanism (hereinafter described) to free the ends of the bricks.

The ends of the levers 21 have apertures for the reception of the links 22, two of which are provided approximately duplicated. The ends of the links extending through the apertures of the levers are threaded and have nuts run thereon forming abutments which engage the levers for the purpose of giving motion thereto, and since these nuts are adjustable it follows that the throw of the lever may be changed according to the adjustment of said nuts. The inner ends of the links are oppositely curved and are pivotally connected to the operating crank-handle 23, which is pivoted to the carriage.

When in position to close the molds, the pivotal point of each link is beyond the pivot of the crank-handle, and hence the said links overlie for a portion of their length. When the operating-handle is moved to draw the links inward, the curve of the links permits the pivots of the links to pass the plane of the pivot of the crank-handle in opposite directions to afford a self-locking combination. In Fig. 1 the operating mechanism is illustrated in a position to hold the sides of the mold in operative position with relation to the ends thereof, while in Fig. 4 the operating crank-handle is turned on its pivot in order to show the links projected, which is the position the links and levers assume when the sides of the molds are retracted.

In order to move the ends of the molds, I provide arms 24, which are pivoted at 25 to the carriage, and said arms have cross-arms 26, to the ends of which the curved links 27 28 are pivoted. The links are pivotally connected to the arms 13 of the bars 12, and as the said links are moved the arms 13 are oscillated with relation to the sides of the molds, the said arms 13 being moved oppositely through the link connections heretofore described. When the arms 24 have been moved initially to operate the links and the ends of the mold, further lift on said arms causes the bar 12 to contact with the side of the carriage and results in the elevation of the carriage to the position illustrated in Fig. 4, and hence the movement of the carriage is entirely under the control of the said arms 24 so far as its pivotal or swinging motion is concerned. It is well to observe that but a slight movement of the arms 24 is required to move the ends of the mold and will, it is thought, be fully appreciated.

The hopper 29, which is used in connection with the mold-sections, has a series of partitions therein corresponding to the walls of the mold, so that material placed in the hopper will find its way to the molds, where it is pressed into shape. The hopper 29 is provided with guides 30, which guides engage the tracks 31, secured to the carriage in any suitable manner, for the purpose of permitting the hopper to be moved to a position over the mold or out of line therewith. Handles 32 are attached to the ends of the hopper for the purpose of manipulation. As the hopper is moved from alinement with the molds the troweling device 33 exerts pressure on the upper surface of the brick to smooth and give a perfect finish. The troweling device has lugs 34 mounted on the pintles 35, which are formed with the hopper. The outer edge of the troweling device is held depressed by the spring 36. The inner ends of said springs are seated on studs 37, carried by the hopper, and the outer ends of said spring are likewise seated on studs 38, formed integral with the troweling device.

Having fully described my invention, what I claim as new, and desire to secure by Letters Patent, is—

1. In a brick-molding apparatus, a stand, a mold and hopper carriage pivoted thereon, sectional molds having movable ends and sides, means for moving the ends, arms for carrying the sides of the molds, rods supporting and moving the sides of the molds, and means for reciprocating the rods.

2. In a brick-molding apparatus, a suitable stand, a mold and hopper carriage pivoted thereon, molds comprising movable sides and ends, the said sides having arms pivoted to the carriage, rods extending through the arms, and means for reciprocating the rods.

3. In a brick-molding apparatus, a stand, a mold and hopper carriage pivoted thereto, molds having movable sides and ends, pivotally connected to the carriage, rods arranged in pairs extending from opposite ends of the carriage, one pair of rods being connected to corresponding sides of the molds, the rods on the opposite end of the carriage being connected to the opposite sides of the molds, and means for reciprocating the rods to move the sides of each mold in opposite directions.

4. In a brick-molding apparatus, a suitable stand, a mold-carriage pivoted thereto, molds having movable sides and ends, arms on the sides of the molds, threaded rods extending through the arms, nuts on the rods engaging the sides of the arms, the said arms extending in opposite directions from the ends of the carriage, the rods from one end passing through the arms of the sides opposite those engaged by the rods from the other end of the carriage, and means for reciprocating the rods.

5. In a brick-molding apparatus, a stand, a mold and hopper carriage mounted thereon, suitable molds on the carriage, a hopper having compartments registering with the molds, means for supporting the hopper free of the molds and permitting its reciprocation with relation to the molds, and a troweling device carried by the hopper and means for pressing the said troweling device into contact with the material in the molds.

6. In a brick-molding apparatus, a suitable stand, a mold-carriage thereon, molds having sides and ends pivotally connected to the carriage, suitable links in connection with the ends of the molds, the inner ends of said links overlying, arms pivoted to the carriage, cross-arms carried by the first-mentioned arms, means for pivotally connecting the overlying ends of the links to the said cross-arms, whereby the movement of the said cross-arms will move the said links in opposite directions, and means for moving the sides of the molds.

7. In a brick-molding apparatus, a suitable stand, a carriage pivoted thereto, molds comprising movable sides and ends, bars to which the ends are secured to be moved in unison, links connected to said bars, the opposite ends of the links overlying, carriage-elevating arms pivoted to the said carriage, cross-arms thereon, to which the links are pivoted, the initial movement of the said arms tending to actuate the links, and the secondary movement of said arms tending to elevate the carriage.

8. In a brick-molding apparatus, a suitable stand, a mold and hopper carriage pivoted thereon, sectional molds having movable sides and ends, rods extending from opposite ends of the carriage and connected to opposite sides of the molds, yokes connecting the rods at each end of the carriage, levers to which the yokes are pivoted, and means for moving the levers in opposite directions.

9. In a brick-molding apparatus, a suitable stand, a mold and hopper carriage pivoted thereon, sectional molds having movable sides and ends, rods extending from opposite ends of the carriage and connected to opposite sides of the molds, yokes connecting the rods at each end of the carriage, levers to which the yokes are pivoted, links connected to the ends of the levers, and a crank-handle to which the ends of the links are pivoted.

10. In a brick-molding apparatus, a suitable stand, a mold and hopper carriage pivoted thereon, sectional molds having movable sides and ends, rods extending from opposite ends of the carriage and connected to opposite sides of the molds, yokes connecting the rods at each end of the carriage, levers to which the yokes are pivoted, links connected to the levers, the said links having curved inner ends adapted to overlie each other, and a crank-handle pivoted to the carriage to which the said links are pivoted.

In testimony whereof I affix my signature, in the presence of two witnesses, this 8th day of February, 1906.

PETER P. WELTY.

Witnesses:
   KATE DONAHUE,
   F. H. DOWNING.